United States Patent [19]

Chambers

[11] Patent Number: 4,642,589
[45] Date of Patent: Feb. 10, 1987

[54] FEED THROUGH FILTER HAVING AN INSULATED BUSH FOR MOUNTING FILTER IN A BULKHEAD

[75] Inventor: Jeffrey Chambers, Ulverston, England

[73] Assignee: Oxley Developments Company Limited, England

[21] Appl. No.: 709,223

[22] Filed: Mar. 7, 1985

[30] Foreign Application Priority Data

Mar. 8, 1984 [GB] United Kingdom ............... 8406110

[51] Int. Cl.[4] ............................................. H03H 7/01
[52] U.S. Cl. ...................................... 333/182; 333/185; 361/302
[58] Field of Search ............... 333/182, 181, 184, 185; 339/147 R, 143 R; 361/302

[56] References Cited

U.S. PATENT DOCUMENTS

| | | | |
|---|---|---|---|
| 2,782,381 | 2/1957 | Dyke | 333/182 |
| 2,973,490 | 2/1961 | Schlicke | 333/182 |
| 3,443,251 | 5/1969 | Garstang et al. | 361/302 X |
| 3,613,033 | 10/1971 | Denes | 333/182 |
| 3,617,832 | 11/1971 | Ito et al. | 361/302 X |
| 3,930,210 | 12/1975 | Hollyday | 333/182 |

FOREIGN PATENT DOCUMENTS 778573 7/1957 United Kingdom ............... 333/182

Primary Examiner—Eugene R. LaRoche
Assistant Examiner—Benny Lee
Attorney, Agent, or Firm—William E. Mouzavires

[57] ABSTRACT

A high frequency interference suppression device comprising a line to line filter which is adapted to be mounted in a metal bulkhead such that both lines are electrically isolated from the bulkhead. The filter comprises a feed-through capacitor whose outer tubular electrode is soldered to the inner periphery of a metal sleeve. The other, inner electrode is isolated from the sleeve. The metal sleeve is adapted to be mounted in an aperture in a bulkhead by means of an insulating bush so that decoupling of interference currents can occur from one line to the other at the bulkhead without connecting either line to the bulkhead itself. By this means, no interference currents are introduced to the bulkhead, or within the bulkhead enclosure via stray capacitances.

10 Claims, 6 Drawing Figures

FEED THROUGH FILTER HAVING AN INSULATED BUSH FOR MOUNTING FILTER IN A BULKHEAD

DESCRIPTION

This invention is concerned with filters and filter systems for use in the protection of electronic systems from external interference sources.

Radio interference suppression measures are commonly taken at the bulkhead of the item of equipment which is to be protected, i.e. where input and output wires (signal sources and returns, and power lines and returns) enter and leave a screened enclosure containing that equipment.

A number of techniques exist for diverting, or reducing interference currents—these include the use of screened cables, lossy cables or sleeving, addition of ferrite beads to increase wire self-inductance, and the use of feed-through capacitors and filters. It is with the latter devices that the present invention is particularly concerned.

Interference currents may contain a wide spectrum of frequencies, extending from tens of kilohertz to several gigahertz. Effective capacitance decoupling of interference frequencies in the high frequency part of the spectrum can only occur through the use of ultra-low inductance capacitors. Feed-through capacitors have this characteristic and are thus commonly used at bulkheads for interference suppression, in both tubular and discoidal form.

Feed-through filters operate to reduce interference currents by diversion of such currents through parallel decoupling and possibly also by series impedance.

The conventional arrangement is for such decoupling to occur between a line passing through a bulkhead, and the metallic bulkhead itself. For this purpose, conventional feed-through capacitors have a metal outer body which is rigidly bolted, soldered or otherwise rigidly attached to the bulkhead. However, such an arrangement has the disadvantage that it can lead to increased current flow within the shielded enclosure by virtue of current flow via stray circuit capacitance.

The principal object of the present invention is to provide a high frequency interference suppression filter which does not introduce increased currents between an enclosure and a feed-through line due to stray capacitance, and which operates effectively at high frequencies without allowing external radiated fields to penetrate the bulkhead.

In accordance with the present invention, there is provided a high frequency interference suppression filter which is designed for bulkhead mounting, the filter being a line-to-line filter and being adapted to be mounted in a metal bulkhead such that both lines are electrically isolated from the bulkhead.

Preferably, the filter comprises a capacitor mounted within a tubular metal sleeve, with one electrode of the capacitor electrically connected to the sleeve, and an insulating bush adapted to mount the metal sleeve in a metal bulkhead aperture so that the metal sleeve, and both electrodes of the capacitor, are electrically isolated from the bulkhead.

Preferably, the capacitor is a conventional, tubular type feed-through capacitor having an inner electrode disposed coaxially within an outer, tubular electrode, said electrode connected to the metal sleeve being the outer, tubular electrode of the capacitor.

Advantageously, the metal sleeve has an outwardly extending flange which, when the metal sleeve is mounted in the bulkhead aperture by means of the insulating bush, at least partially overlies the bulkhead aperture to restrict the entry of direct radiation interference into the interior of the bulkhead via said aperture.

Preferably, the metal sleeve is mounted in the bulkhead aperture using the technique incorporated in OXLEY BARB CONE-LOCK plug and socket systems wherein the sleeve is formed with a conical projection adapted to distort the insulating bush outwardly to provide a retaining shoulder for retaining the sleeve and bush within the aperture.

The invention is described further hereinafter, by way of example only, with reference to the accompanying drawings, in which.

Figure 1:
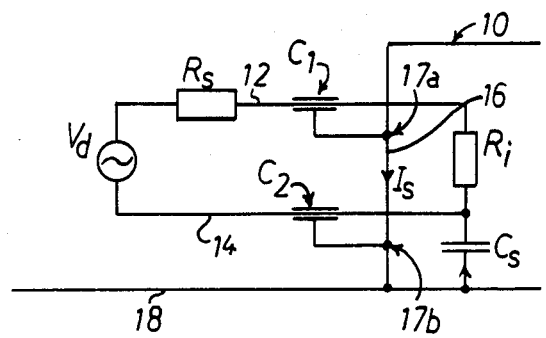
FIG. 1 illustrates the use of conventional feed-through filters for differential mode interference currents.

With reference to FIG. 1, a signal line 12 enters a metallic screened enclosure 10 and a signal return line 14 leaves the enclosure 10 by way of respective feed-through filters $C_1$ and $C_2$ mounted in the enclosure wall 16. A differential mode interference source represented by Vd and Rs applies interference currents to the input line 12. Ri represents the input impedance of internal circuitry and Cs represents internal stray capacitance to ground. Ground is represented by the line 18. The filters $C_1$ and $C_2$ are in each case decoupled to ground 18 by virtue of the connection of their outer electrodes directly to the enclosure wall 16, as indicated at 17a and 17b. It will be noted that by decoupling the interference currents to the enclosure wall 16, a current Is is established in the wall 16 which can flow back to the signal lines by way of the stray capacitance Cs.

Thus, where as in FIG. 1, a signal line 12 and signal return 14 are employed, with a separate ground return 18 to the enclosure screen 16, use of line to ground decoupling capacitors $C_1$ and $C_2$ introduces currents Is into the enclosure screening. It is not a safe assumption to suggest that all decoupling will occur to the outside of the screened enclosure (where skin effect would prevent radiation into the enclosure) and the use of line to ground decoupling capacitors can therefore introduce currents to the isolated ground.

In addition, a current flow path is introduced by way of the stray capacitance Cs, which occurs between the screened circuitry and the enclosure walls; this capacitance may be of the order of 100 pf or more. Such current may then cause radiative pick-up on the susceptible circuitry disposed within the enclosure.

Figure 2:
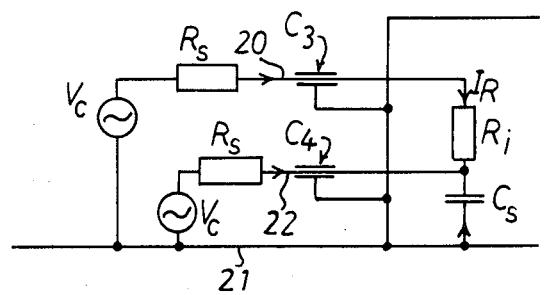
FIG. 2 illustrates the use of conventional feed-through filters for common mode interference currents.

FIG. 2 shows the use of known filters $C_3$ and $C_4$ for common mode interference sources Vi, between ground 21 and each signal line 20,22. If the feedthrough capacitors C3 and C4 were equal in value, and the stray capacitance Cs zero, there would be no interference current in the load resistance Ri. In practice, a characteristic of known feed-through capacitors (which are usually ceramic) is their wide tolerances (typically to 150% of nominal value). This causes an imbalance in the circuit of FIG. 2. Similarly, the stray capacitance Cs is in practice non-zero. Thus, in FIG. 2, imbalance in values of decoupling capacitances C3 and C4, and the presence of stray capacitance Cs, cause current flow $I_R$ in the load resistance Ri.

Figure 3:
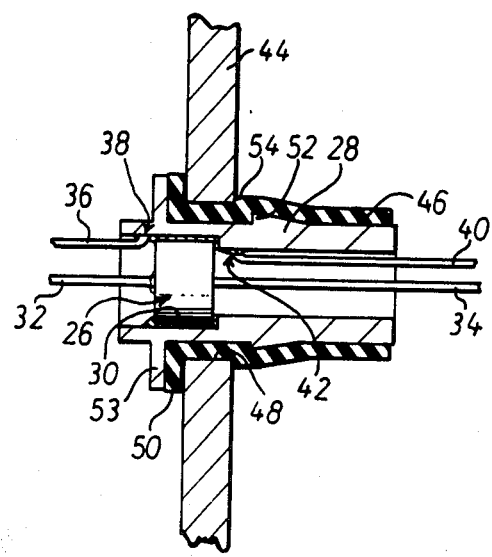
FIG. 3 illustrates one embodiment of a feed-through filter in accordance with the present invention, mounted in an enclosure wall.

The filter of FIG. 3 in accordance with the present invention is adapted to be mounted in a bulkhead 44 but to be electrically isolated from the bulkhead so as to provide line to filtering instead of line to ground. For this purpose, a feed-through capacitor 26 is mounted within a sleeve 28 of an electrically conductive material, with the outer electrode of the capacitor 26 electrically connected, for example by soldering, to the inner periphery of the sleeve 28. This connection, which must be of low impedance, is indicated by the reference numeral 30. The inner electrode of the capacitor 26 is coupled to a terminal lead 32 for connection to an external signal line (not shown) and a terminal lead 34 for connection to an internal signal line (not shown). A terminal lead 36 for connection to an external return line (not shown) is connected to the internal surface of the tube 28 at 38 and a terminal lead 40 for connection to an internal return line (not shown) is connected to the internal surface of the tube 28 at 42.

FIG. 3 shows one way in which the filter can be mounted into the chassis or bulkhead wall 44. This uses the technique incorporated in OXLEY BARB (Registered Trade Mark) CONE-LOCK PLUG AND SOCKET SYSTEMS wherein an insulating bush 46, preferably made of polyletrafluoroethylene, is inserted into a hole 48 in the bulkhead wall 44 until a flange 50 on the bush engages the outside surface of the bulkhead wall 44. The metal sleeve 28 containing the feedthrough capacitor 26 is then inserted into the bush 46, from left to right as viewed in FIG. 3, until a conically shaped projection 52 on the external periphery of the sleeve 28 has passed beyond the wall 44 and a flange 53 on the sleeve 28 is in engagement with the flange 50 of the insulating bush 46. The conical projection 52 on the sleeve causes the insulating bush 46 to be distorted outwardly to form a shoulder 54 of outside diameter greater than the diameter of the hole 48. The two sides of the wall 44 are therefore engaged respectively by the flange 50 and shoulder 54 to thereby firmly fix the sleeve 28 and bush 46 within the hole 48.

It is not essential, however, to use the latter mounting technique and any other convenient mounting method may be used which allows line to line decoupling to occur at the bulkhead whilst electrically isolating the capacitor from the bulkhead.

It will be noted from FIG. 3 that the metal flange 53 of the sleeve 28 is of greater diameter than that of the hole 48 in the bulkhead wall 44 and that the flange 53 lies over the hole 48 to assist in preventing direct radiation from entering the enclosure via the hole 48.

The filter embodiment of FIG. 3 comprises a capacitor only. The embodiment of FIG. 4 includes a tubular ferrite core 56 which embraces the terminal leads 34' and 40' whereby to introduce series inductance to interference currents in the latter leads 34', 40', as is advantageous in some applications. The embodiment of FIG. 4 is otherwise identical to the embodiment of FIG. 3.

Figure 5:
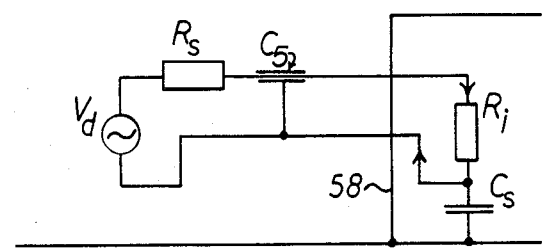
FIG. 5 illustrates the use of a filter in accordance with the present invention for differential mode interference currents.

FIG. 5 is a circuit diagram showing the embodiment of FIG. 3 in differential mode operation. The enclosure wall is indicated by numeral 58, the internal load resistance by Ri, the stray internal capacitance to ground by Cs and the filter itself by C5. It will be noted that no interference currents are introduced to the enclosure wall and the isolated ground system 60, and no interference currents flow in the stray capacitance Cs.

Figure 6:
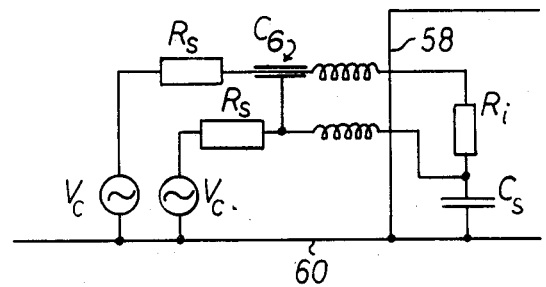
FIG. 6 illustrates the use of a filter in accordance with the present invention for common mode interference currents.
Figure 4:
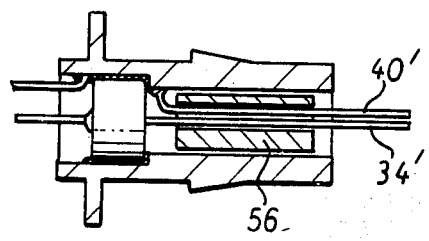
FIG. 4 illustrates another embodiment in accordance with the present invention, having series inductors.

FIG. 6 shows the common mode circuit using a filter C6 as in FIG. 4. Common mode performance of the line-to-line filter is gained by the addition of series inductance L in the two lines. It is convenient to use a single inductive core as in FIG. 4, providing a bifilar construction.

If the inductance L is included in the differential mode circuit, the magnetic fluxes in the two leads are largely self-cancelling and the filter is effectively a decoupling capacitor only. For the common mode circuit, the problem of unbalanced capacitors does not arise, there being just one capacitor decoupling component.

For effective high frequency operations, feedthrough capacitors should be used; however, lower frequency decoupling permits the use of other types of capacitors within the tube 28.

The tube 28 is normally made of brass, but could be of any suitable metal of high electrical conductivity to which one can make a low impedance connection for the capacitor.

In the event that it is required to have inductors in the terminal leads on the outer side of the capacitor (i.e. to the left of the capacitor as viewed in FIG. 3), the sleeve 28 would preferably be extended outwardly to enclose such inductors therewithin.

I claim:

1. A high frequency interference suppression device comprising:
   (a) a tubular metal sleeve means;
   (b) a feed-through line passing through said tubular metal sleeve and electrically isolated therefrom,
   (c) a capacitor having two electrodes connected to respective terminations, the capacitor being mounted within said tubular metal sleeve, with one termination of the capacitor electrically connected to the metal sleeve and the other termination isolated from said sleeve and connected to said feed-through line; and
   (d) insulating bush means surrounding said metal sleeve and adapted to mount the metal sleeve in an aperture of a metal bulkhead so that the metal sleeve and both electrodes of the capacitor are electrically isolated from said bulkhead.

2. A device according to claim 1, wherein the capacitor is a feed-through capacitor and wherein said two electrodes comprise an inner electrode disposed coaxially within an outer electrode, said one termination connected to the metal sleeve being the outer electrode of the feed-through capacitor.

3. A device according to claim 2, including a radially outwardly extending annular flange on the metal sleeve which has a dimension greater than a dimension of said bulkhead aperture so that, when the metal sleeve is mounted in the bulkhead aperture by means of the insulating bush such that said flange lies adjacent the bulkhead, the flange at least partially covers said bulkhead aperture thereby effectively to narrow the gap between the aperture and the metal sleeve for restricting the entry of direct radiation interference into the interior of the bulkhead via said aperture.

4. A device according to claim 1, including an annular flange on said insulating bush means and engageable with one side of a bulkhead, and a conical projection formed on the outer periphery of the metal sleeve for the purpose of forming a shoulder on the bush means engageable with the other side of the bulkhead when the insulating bush is first inserted into the bulkhead aperture until said flange on the bush engages one side of the bulkhead wall and the metal sleeve is then introduced axially into the bush.

5. A device according to claim 2, wherein the outer electrode of the feed-through capacitor is soldered within the inner periphery of the metal sleeve, with the capacitor contained wholly within the said length of the sleeve.

6. A device according to claim 5, further comprising a first terminal wire which extends out of one end of the metal sleeve and is soldered to the inner periphery of the sleeve closely adjacent to one end of the feed-through capacitor and a second terminal wire which extends out of the other end of the metal sleeve and is soldered to the inner periphery of the sleeve closely adjacent to the other end of the feed-through capacitor.

7. A device according to claim 6, including a first inductor disposed in said second terminal wire and a second inductor disposed in said feed-through line, said first and second inductors being contained within the axial level of said metal sleeve.

8. A device according to claim 6, including a ferrite core embracing one of the two pairs of wires leading to the capacitor and comprised by the first terminal wire and said feed-through line and by the second terminal wire and said feed-through line, respectively, whereby to incorporate inductance into these wires, the ferrite core being contained within the axial length of said metal sleeve.

9. A high frequency interference suppression device comprising:
(a) a tubular metal sleeve;
(b) a feed-through line passing through said tubular metal sleeve and electrically isolated therefrom;
(c) a capacitor having two electrodes connected to respective terminations, the capacitor being mounted within said tubular metal sleeve, with one termination of the capacitor electrically connected to the metal sleeve and the other termination isolated from said sleeve and connected to said feed-through line;
(d) an insulating bush adapted to embrace the metal sleeve for mounting the metal sleeve in an aperture of a metal bulkhead so that the metal sleeve and both electrodes of the capacitor are electrically isolated from said bulkhead; and
(e) a radially outwardly extending annular flange on the metal sleeve which has a dimension greater than a dimension of said bulkhead aperture so that, when the metal sleeve is mounted in the bulkhead aperture by means of the insulating bush such that said flange lies adjacent the bulkhead, the flange of least partially covers said bulkhead aperture, whereby to restrict the entry of direct radiation interference into the interior of the bulkhead via said aperture.

10. A high frequency interference suppression device comprising:
(a) a tubular metal sleeve;
(b) a feed-through line passing through said tubular metal sleeve and being electrically isolated therefrom;
(c) a capacitor having two electrodes connected to respective terminations, the capacitor being mounted within said tubular metal sleeve, with one termination of the capacitor electrically connected to the metal sleeve and the other termination isolated from said sleeve and connected to said feed-through line;
(d) an insulating bush adapted to embrace the metal sleeve for mounting the metal sleeve in an aperture of a metal bulkhead so that the metal sleeve and both electrodes of the capacitor are electrically isolated from said bulkhead;
(e) a radially outwardly extending annular flange on the metal sleeve which has a dimension greater than a dimension of said bulkhead aperture so that, when the metal sleeve is mounted in the bulkhead aperture by means of the insulating bush such the said flange lies adjacent the bulkhead, the flange at least partially covers said bulkhead aperture, whereby to restrict the entry of direct radiation interference into the interior of the bulkhead via said aperture; and
(f) a conical projection formed on the outer periphery of the metal sleeve for the purpose of deforming the bush to engage the other side of the bulkhead upon assembly.

* * * * *